July 3, 1923.

E. R. VIBERG 1,460,773

FORGED BRAKE BEAM FULCRUM AND PROCESS OF MAKING SAME

Filed Oct. 24, 1921

Inventor
Ernest R. Viberg
By Fetherstonhaugh & Co
Attys.

Patented July 3, 1923.

1,460,773

UNITED STATES PATENT OFFICE.

ERNEST R. VIBERG, OF MONTREAL, QUEBEC, CANADA.

FORGED BRAKE-BEAM FULCRUM AND PROCESS OF MAKING SAME.

Application filed October 24, 1921. Serial No. 509,999.

*To all whom it may concern:*

Be it known that I, ERNEST R. VIBERG, a subject of the King of Great Britain, and resident of the city of Montreal, in the Province of Quebec and Dominion of Canada, have invented certain new and useful Improvements in Forged Brake-Beam Fulcrums and Processes of Making Same, of which the following is a full, clear, and exact description.

This invention relates to improvements in brake beam fulcrums and method of making same, and the object of the invention is to provide a strong, durable and inexpensive fulcrum which may be manufactured very easily and quickly from readily obtainable material.

The invention comprises briefly a fulcrum formed to tubular shape by bending up a flat sheet of material and welding the edges together, or not, as desired.

In the drawings which illustrate one embodiment of the invention:—

Figure 1:
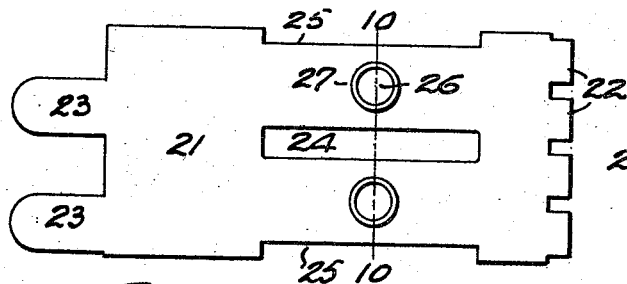
Fig. 1 is a plan view of a blank used in forming the fulcrum.

Referring more particularly to the drawings, 21 designates a flat blank, preferably stamped to the shape shown in Figure 1, that is to say, with four short, closely spaced projections 22 on one end, and a pair of comparatively long, widely spaced projections 23 at the opposite end arranged asymmetrically of the blank. The middle portion of the blank is provided with a central longitudinally disposed slot 24 and with a pair of notches 25 disposed one in each longitudinal edge thereof, and each notch being the same length and substantially half the width of the slot 24, so that if the two longitudinal edges of the blank are brought together the notches 25 will unite to form two slots exactly similar to the slots 24 and disposed diametrically opposite the same. Between the slots 24 and notches 25 and substantially midway of the length thereof, a pair of circular openings 26 are formed, each surrounded by a lip or boss 27 projecting from one surface of the plate. These openings 26 are designed to receive a pivot pin to connect a brake lever to the fulcrum. The holes 26 as initially formed may be much smaller than the finished size, so as to permit of the metal being upset or expanded to enlarge the holes and provide the bosses 27.

Figure 10:
Fig. 10 is an enlarged sectional view on the line 10—10, Figure 1, illustrating the preliminary forming of the pin bosses.
Figure 11:
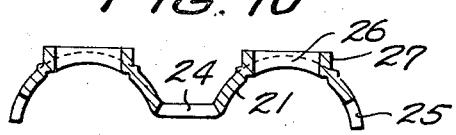
Fig. 11 is a corresponding view illustrating the complete forming of the bosses and a preliminary step in forming the flat blank to tubular shape.

The bosses may be formed in a variety of ways. Preferably they are formed from the metal of the blank by upsetting or expanding the metal around the apertures 26 to form flanges as indicated in Figure 10. These flanges will naturally stiffen the plate and interfere with the bending thereof to cylindrical form. Therefore, after the preliminary forming, the plate is placed between dies which form it to two substantially semicircular portions, as illustrated in Figure 11, and at the same time gives final form to the bosses 27.

Figure 12:
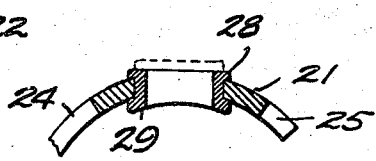
Fig. 12 is an enlarged sectional view illustrating an alternative method of forming the pin bosses.

It will be obvious that the plate may be bent to tubular form before the bosses 27 are formed and that the bosses may then be formed. It will be obvious, however, that the bosses will not be so easily formed by this latter method and therefore the former method is preferable. It will also be understood that the bosses 27 may be formed of separate members, such as flanged ferrules 29 thrust through the openings and then swaged as indicated in Figure 12, both to hold the ferrules in place and to impart suitable curvature thereto.

Figure 2:
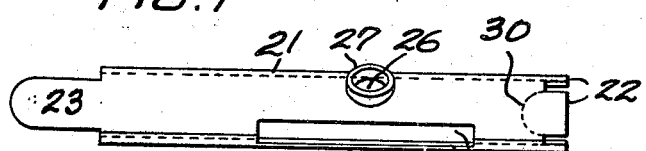
Fig. 2 is a plan view of the blank bent to tubular form.

The tubular form of the fulcrum is arrived at preferably after the bosses 27 have been formed, but it will be understood that the blank of Figure 1 may be bent to tubular form and the bosses provided afterwards. Preferably, however, the curvature imparted to the blank in forming the bosses serves as a preliminary bending step. It will be noted that this curving of the blank provides two nearly semi-circular portions connected by a flat portion representing the unbent metal at the ends of the slot 24. To complete the tubular formation the plate or blank, when in the shape illustrated in Fig. 11, is bent by means of dies around a mandrel, so that it assumes a true cylindrical shape and the longitudinal edges at each end of the notches 25 are brought into abutting relation. If the blank has been properly heated and sufficient pressure is applied the edges will be welded together in the same manner as butt weld pipe is made. It will be understood, however, that actual welding may be omitted as the tubular form will in itself be sufficiently strong without the additional stiffening that will result from welding. The fulcrum has now reached the stage illustrated in Figures 2 and 3.

Figure 3:
Fig. 3 is an end elevation corresponding with Figure 2.
Figure 4:
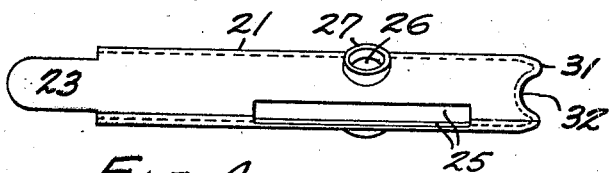
Fig. 4 is a plan view of the fulcrum showing the outer end formed.
Figure 5:
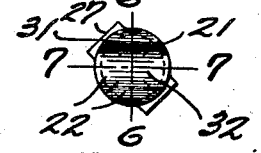
Fig. 5 is an end elevation corresponding to Figure 4.
Figure 7:
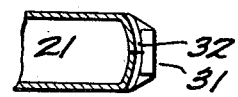
Fig. 7 is a section on the line 7—7, Figure 5.

It will be noted, especially in Figure 3, that the projections 24 are spaced equidistantly around the tube. This end of the tube is now heated and placed in suitable dies which bend in two opposite projections 22, so that they are substantially doubled or bent upon the wall of the tube. The remaining two projections are bent in across the tube, so as to substantially meet at the centre thereof, as illustrated in Figure 7. This bending in of the second pair of projections preferably starts from a point well below the bottoms of the projections, as indicated by the dotted line 30 in Figure 2. The first pair of projections form lips 31 to retain the tension member of a brake beam or the like, and the second pair of projections form a seat 32 between the lugs 31, this seat being preferably curved from end to end, as clearly shown in Figure 7.

Figure 8:
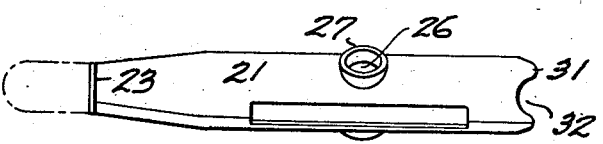
Figs. 8 and 9 are respectively a plan and elevation showing the attaching lugs formed.
Figure 6:
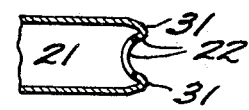
Fig. 6 is a section on the line 6—6, Figure 5.
Figure 9:
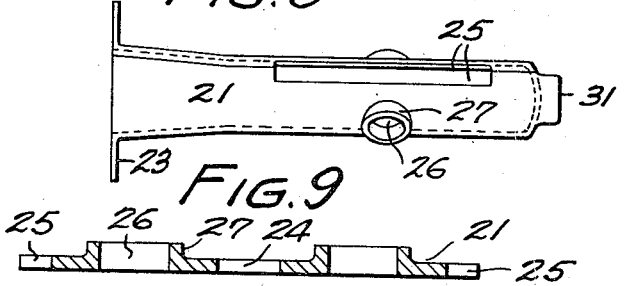

The opposite end of the tube may now be slightly flattened as indicated in Figure 8, and the projections 23 turned at right angles to the axis of the tube, as shown in Figure 9, to form lugs by which the fulcrum may be attached to a brake beam.

Nothing has been said regarding the dimensions or particular shape of the fulcrum, as this is obviously a matter of design and not of invention. It may, however, be well to draw attention to the fact that the projections 22 must be so spaced relatively to, say, the slot 24 that the seat formed by these members will be in proper angular relation to the plane of oscillation of a brake lever passing through the slot 24. Obviously many modifications may be made in the form of the fulcrum and in the specific details of the process of manufacturing same. In fact, it is impossible to lay down every detail of a process as the details of manufacture may necessarily be varied by changes in the design.

The fulcrum according to this invention may be formed very easily and cheaply of ordinary sheet metal, in many cases of small pieces of metal which would otherwise be scrapped. It will be understood that as the bosses 27 may be formed on a tubular body that the fulcrum may also be formed from pipe, thus enabling short lengths of pipe, which would otherwise be wasted, to be utilized. The process of forming the fulcrums is quick and easy and does not require the use of heavy or special machinery. The fulcrum itself is extremely strong and yet of comparatively light weight. The longitudinal seam need not be welded as has already been stated. The curve of the tension member over its seat 32 will serve to hold an unwelded fulcrum from opening at the end, while the pivot pin which passes through an intermediate point of the fulcrum will hold the butt joint from opening at this point. There is, as a matter of fact, little or no strain on the fulcrum between the pivot pin and the lugs 23 attached to the compression member and it is immaterial if the seam opens somewhat between these points.

Having thus described my invention, what I claim is:—

1. A brake beam fulcrum comprising a flat sheet bent to substantially cylindrical form, projections from one end of said sheet turned inwardly and forming a tension member seat and tension member retaining lugs, and outwardly directed feet at the opposite end of the fulcrum.

2. A process of making brake beam fulcrums which comprises forming a flat blank, bending the blank to substantially cylindrical form and turning in one end of the cylindrically formed blank to provide a tension member seat.

3. A process of making brake beam fulcrums which comprises forming a flat blank, bending spaced portions of the blank to substantially the finished cylindrical curvature and simultaneously forging pin hole bosses in the curved portions and then bending the blank intermediate the curved portions to form a tubular body.

4. A process of making brake beam fulcrums which comprises forming a flat blank, bending to the finished curvature spaced portions of the blank extending from opposite edges inwards and simultaneously forming pin hole bosses in the curved portions and then bending the blank between the curved portions to bring the edges of the curved portions together.

5. A process of making brake beam fulcrums, which comprises forming a flat blank, upsetting the blank to form pin hole bosses, bending the blank to tubular form, turning in one end of the blank to form a tension member seat, and forming outwardly turned lugs at the opposite end of the blank for attachment to a compression member.

6. A process of making brake beam fulcrums, which comprises shaping a blank to provide a series of short fingers at one end and a series of longer fingers at the opposite end and to provide an opening in the body of the blank and notches in the edges thereof, bending said blank to tubular form whereby the notches unite to form an opening corresponding to the opening of the blank and located opposite same, and turning in certain of the short fingers of the blank through approximately 90° to form a tension member seat, and turning in the remaining fingers through approximately 180° to form tension member retaining lugs on each side of the seat, and turning out the long fingers at the opposite end of the blank to form attaching plugs.

7. In a process of making brake beam fulcrums, forming a blank having an opening and notches in the edges thereof corresponding to said opening, forming pin holes and pin hole bosses between the opening and notches, and bending the blank to tubular form whereby the notches unite to form an opening opposite the blank opening and the pin holes are brought into alignment with one another at right angles to the plane of the opening.

In witness whereof, I have hereunto set my hand.

ERNEST R. VIBERG.